United States Patent
Schneider

(10) Patent No.: US 8,804,953 B2
(45) Date of Patent: Aug. 12, 2014

(54) EXTENSIVE CIPHERTEXT FEEDBACK

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1241 days.

(21) Appl. No.: 12/273,316

(22) Filed: Nov. 18, 2008

(65) Prior Publication Data

US 2010/0124328 A1    May 20, 2010

(51) Int. Cl.
*H04L 9/22* (2006.01)
*H04L 9/28* (2006.01)

(52) U.S. Cl.
USPC ............. 380/42; 380/28; 380/37; 380/255; 713/155; 713/160; 713/193

(58) Field of Classification Search
CPC .................................. H04L 9/22; H04L 9/28
USPC ............. 713/191; 380/28, 29, 42, 255, 263
See application file for complete search history.

(56) References Cited

U.S. PATENT DOCUMENTS

| 6,122,379 | A * | 9/2000 | Barbir | 380/269 |
| 2004/0250095 | A1 * | 12/2004 | Feldman | 713/191 |
| 2008/0267314 | A1 * | 10/2008 | Bar-Sade et al. | 375/272 |

OTHER PUBLICATIONS http://crypto.stanford.edu/~dabo/papers/ccaibejour.pdf "Chosen-Ciphertext Security from Identity-Based Encryption"—Jun. 2006, Bonet et al, Stanford Univ.*
http://www.shoup.net/papers/cca-fac.pdf "Practical Chosen Ciphertext Secure Encryption from Factoring"—Hofheinz et al, Nov. 2005.*

* cited by examiner

*Primary Examiner* — Randy Scott
(74) *Attorney, Agent, or Firm* — Lowenstein Sandler LLP

(57) ABSTRACT

Some embodiments of a method and apparatus for encrypting and decrypting data have been presented. In one embodiment, a stream cipher is run in parallel with a block cipher to output a stream of bits with a length equal to a number of ciphertext blocks in an output stream of the block cipher. The method may further include pre-processing a current plaintext block based on the stream of bits and the number of ciphertext blocks in the output stream of the block cipher. Then the block cipher may encipher the pre-processed block to generate a current ciphertext block.

26 Claims, 5 Drawing Sheets

EXTENSIVE CIPHERTEXT FEEDBACK

TECHNICAL FIELD

Embodiments of the present invention relate to data encryption, and more specifically to extensive ciphertext feedback.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher. As such, the term "encipher" and "encrypt" may be used interchangeably in the following discussion. Likewise, the term "decipher" and "decrypt" may also be used interchangeably in the following discussion.

Encryption is used to protect military and civilian systems, examples of which include Internet e-commerce, mobile telephone networks, bank automatic teller machines, etc. As technology and computing power advance, new vulnerabilities are commonly discovered for encryption mechanisms that were previously considered secure. When such weaknesses are discovered, new encryption mechanisms and techniques are required to maintain security of sensitive information.

Conventionally, cyphertext block chaining provides an encryption mode to prevent an attacker from being able to create a code table from commonly repeated blocks. For instance, a block of all space characters always results in the same ciphertext block. Specifically, an output stream is prepended with a random block, which is referred to as an initialization vector (IV). For each block to be enciphered, the IV is combined with the current block of plaintext using a binary exclusive or (XOR) operation. Then the resulting block is enciphered with a key. The current IV is replaced with the resulting enciphered block, which is appended to the output stream.

One problem with the above conventional approach is that no additional security is provided against known plaintext attacks, since an attacker in possession of known plaintext can still determine the input to the encipherment function by simply XOR'ring the known plaintext with the appropriate ciphertext block.

BRIEF DESCRIPTION OF THE DRAWINGS

The present invention is illustrated by way of example, and not by way of limitation, in the figures of the accompanying drawings and in which.

DETAILED DESCRIPTION

Figure 1:
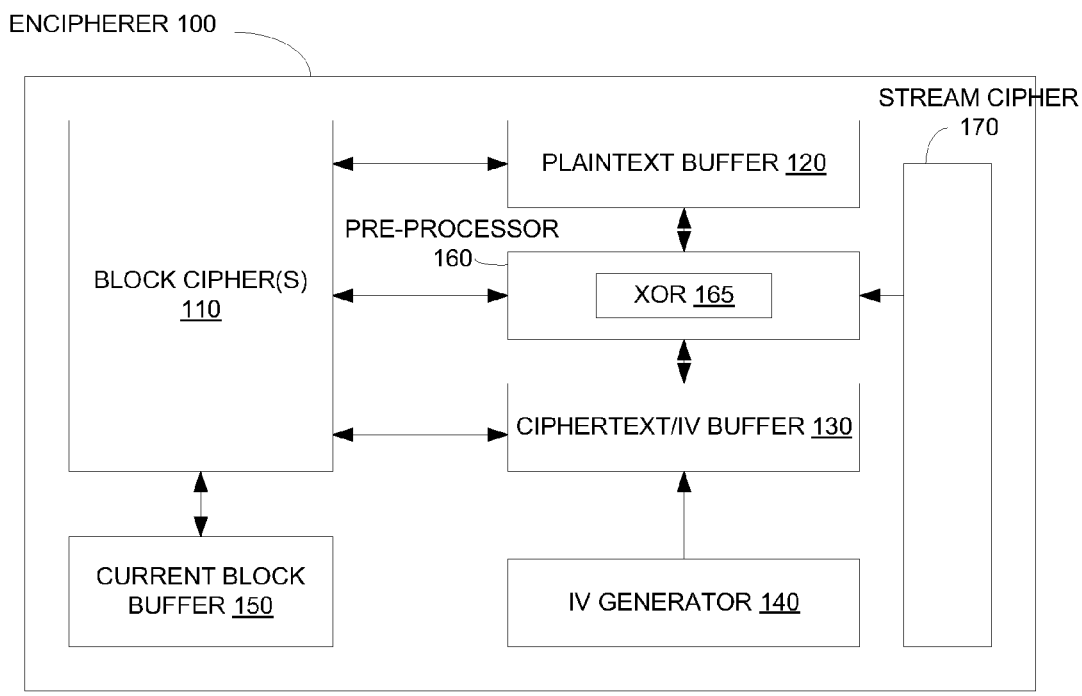
FIG. 1 illustrates an encipherer, in accordance with one embodiment of the present invention.

Described herein are embodiments of a method and apparatus for implementing extensive ciphertext feedback. In one embodiment, a stream cipher is run in parallel with a block cipher to output a stream of bits with a length equal to a number of ciphertext blocks in an output stream of the block cipher. The method may further include pre-processing a current plaintext block based on the stream of bits and the number of ciphertext blocks in the output stream of the block cipher. Then the block cipher may encipher the pre-processed block to generate a current ciphertext block. More details of some embodiments of ciphertext feedback are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of an encipherer 100. The encipherer 100 enciphers (or encrypts) and deciphers (or decrypts) data. Note that encipherer 100 may be referred to as a decipherer when used to decipher data. In one embodiment, the encipherer 100 includes one or more block ciphers 110, which are coupled to one or more input buffers and one or more output buffers. When encrypting, the input buffer is identified with plaintext buffer 120, and the output buffer is identified with ciphertext/IV buffer 130. The ciphertext/IV buffer 130 may be coupled with an IV (initialization vector) generator 140. When decrypting, the input buffer is identified with ciphertext/IV buffer 130, and the output buffer is identified with plaintext buffer 120. The encipherer 100 may also include a current block buffer 150 coupled to the block ciphers 110.

In some embodiments, encipherer 100 further includes a stream cipher 170 and a pre-processor 160. The stream cipher 170 runs in parallel with the block ciphers 110 to generate a stream of pseudo-random bits. The pre-processor 160 uses this stream of bits to pre-process plaintext blocks before enciphering. In some embodiments, the pre-processor 160 includes an exclusive-OR (XOR) module (e.g., an XOR gate, a processor configured to execute an XOR operation, etc.). In some embodiments, the stream cipher 170 uses both a master and a message key. More details of the operation of the pre-processor 160 are discussed below.

Block ciphers 110 are substitution ciphers that operate on fixed-length groups of bits known as blocks. For example, a block may have 64 bits of data, 128 bits of data, 256 bits of data, etc. Where data to be encrypted is longer than a block, the data may be divided into multiple blocks, and each block is separately encrypted. In one embodiment, block ciphers may execute an encryption and a decryption algorithm, each of which accepts an input block of size n bits as a first input and a key of size k bits as a second input, and produce an n-bit output block. For example, a block cipher might take as an input a 128-bit block of plaintext (which is unciphered data) and an 80-bit key, and output a corresponding 128-bit block of ciphertext (which is ciphered data). Likewise, the block cipher may take as an input a 128-bit block of ciphertext and the 80-bit key, and output a 128-bit block of plaintext. Note that the input block and the output block have to be of the same size. Some exemplary block sizes for a block cipher to operate on include 64 bit (i.e., 8 byte) and 128 bit (i.e., 16 byte), and some exemplary common key sizes include 40 bits, 56 bits, 64 bits, 80 bits, 128 bits, 160 bits, 168 bits, 192 bits, and 256 bits. Other sized blocks and keys may also be used. Some examples of block ciphers include twofish, blowfish, serpent, data encryption standard (DES), advanced encryption standard (AES), CASTS, international data encryption algorithm (IDEA), etc.

Plaintext buffer 120 may be a storage device or part of a storage device that contains unencrypted data. The data may be either awaiting encryption, or the result of decryption.

Likewise, ciphertext/IV buffer 130 may be a storage device or part of a storage device that contains encrypted data. The data may be either awaiting decryption, or the result of encryption.

Current block buffer 150 may be a storage device or part of a storage device large enough to contain a bit sequence that is the same size as the input block size or the output block size of the block ciphers 110. Block ciphers 110 may retrieve data to be enciphered from current block buffer 150 when encrypting. Alternatively, block ciphers 110 may store the deciphered data into current block buffer 150 when decrypting.

In some embodiments, IV generator 140 creates an initialization vectors (IV) by generating a block of random data. The IV may then be stored in the ciphertext/IV buffer 130. In some embodiments, the IV is used as the message key for the stream cipher 170. The IV is also prepended to an output ciphertext stream. The encipherer 100 then combines the IV with the first plaintext block. For example, the encipherer 100 may perform an XOR function on the IV and the first plaintext block. The result is then enciphered by the block ciphers 110 to generate a first ciphertext block, which is stored in the ciphertext/IV buffer 130.

To encrypt each of the remaining plaintext blocks, block(s) from the ciphertext/IV buffer 130 are combined with a current plaintext block to be encrypted from the plaintext buffer 120, such as by XOR'ing these blocks with each other using the XOR module 165. The pre-processor 160 may select ciphertext block(s) from the ciphertext/IV buffer 130 that correspond to bits having a predetermined value (e.g., a "1" bit) in the stream of bits generated by the stream cipher 170. Note that the bits in the stream of bits from the stream cipher 170 have a one-to-one correspondence with the ciphertext block(s) in the ciphertext/IV buffer 130. In one embodiment, the most recently generated ciphertext block is always XOR'ed with the plaintext block.

The resultant block from the pre-processor 160 is then provided to the block cipher(s) 110 to be enciphered into a current ciphertext block. The current ciphertext block may be appended to the current contents of the ciphertext/IV buffer 130. In some embodiments, ciphertext/IV buffer 130 may not be large enough to hold all ciphertext blocks of an entire message. Thus, the pre-processor 160 may use as many bits as are in the ciphertext/IV buffer 130 at any one time.

In some embodiments, only the most recent several blocks of ciphertext are used in the encryption. For example, encipherer 100 may use only the most recent 64 or 128 blocks.

In some embodiments, encipherer 100 decrypts data that has been encrypted using the above approach. In some embodiments, encipherer 100 receives a stream of ciphertext blocks. In addition, the stream cipher 170 is run in parallel with the block ciphers 110 of the encipherer 100 to generate a stream of pseudo-random bits. A current ciphertext block in the stream is loaded into the ciphertext/IV buffer 130. Block ciphers 110 may decipher the current ciphertext block from the ciphertext/IV buffer 130, and provides the deciphered block to the pre-processor 160. The pre-processor 160 may combine the deciphered block with one or more ciphertext blocks in the stream of ciphertext blocks that correspond to bits having a predetermined value (e.g., a "1" bit) in the stream of bits to generate a current plaintext block. For example, the pre-processor 160 may XOR the deciphered block with the one or more ciphertext blocks corresponding to a "1" bit in the stream of bits. The current plaintext block is then appended to a stream of output plaintext blocks. Encipherer 100 repeats the above process to decipher the ciphertext blocks sequentially until all ciphertext blocks in the incoming ciphertext stream have been decrypted.

In some embodiments, the above ciphertext feedback mechanism is combined with other ciphertext block chaining mechanisms (e.g., variable block chaining) to provide a hybrid chaining encryption scheme.

Figure 2:
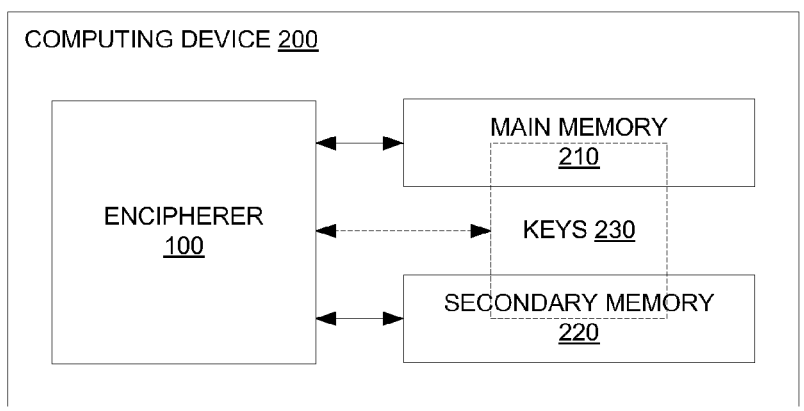
FIG. 2 illustrates an exemplary computing device, in accordance with one embodiment of the present invention.

FIG. 2 illustrates an exemplary computing device 200, in accordance with one embodiment of the present invention. The computing device 200 includes encipherer 100 connected with a main memory 210 and a secondary memory 220. Details of some embodiments of encipherer 100 have been described above. The main memory 210 may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory 220 may include one or more persistent data storage devices that may include, for example static memory, hard drives, optical drives, tape backup systems, etc. The secondary memory 220 may be local to the computing device 200 (as illustrated), or external to the computing device 200.

In one embodiment, keys 230 are stored in secondary memory 220. In another embodiment, keys 230 are stored in main memory 210. Keys 230 may be stored, for example, in a protected region of main memory 210 or secondary memory 220 (memory accessible only to certain processes). In yet another embodiment, keys 230 are stored externally to computing device 200. Such externally stored keys 230 may be stored, for example, in a universal serial bus (USB) dongle, firewire dongle, or other external storage device. In embodiments that implement external keys, encrypted regions of the main memory 210 and secondary memory 220 may not be decrypted unless the external storage device having keys 230 is communicatively coupled to computing device 200.

Keys 230 may include one or more block cipher keys for use with block cipher(s) 110 of encipherer 100. In one embodiment, keys 230 also include the initialization vector to use in current block buffer 150 of encipherer 100 when encryption or decryption is started. In one embodiment, keys 230 are encrypted such that a password must be provided to enable access to them. Alternatively, keys 230 may not be encrypted.

In one embodiment, encipherer 100 is a hardware component of computing device 200. Alternatively, encipherer 100 may include software that is part of an operating system, an application, or a combination thereof. Encipherer 100 may also be a combination of two or more of software, firmware, and hardware.

In some embodiments, encipherer 100 can encipher data in the main memory 210 and the secondary memory 220 to secure such data. When enciphering data, new keys are generated using previously enciphered blocks (also referred to as prior ciphertext blocks), and the generated keys may or may not be stored. In one embodiment, the encipherer 100 is configured to encrypt data in all of secondary memory 210 and main memory 220. In another embodiment, only some of the data in main memory 210 and/or secondary memory 220 is encrypted (e.g., using file system-level encryption). In both instances, encrypted data may not be read or used until encipherer 100 deciphers the enciphered data using the same keys 230 used to encrypt the data.

Figure 3:
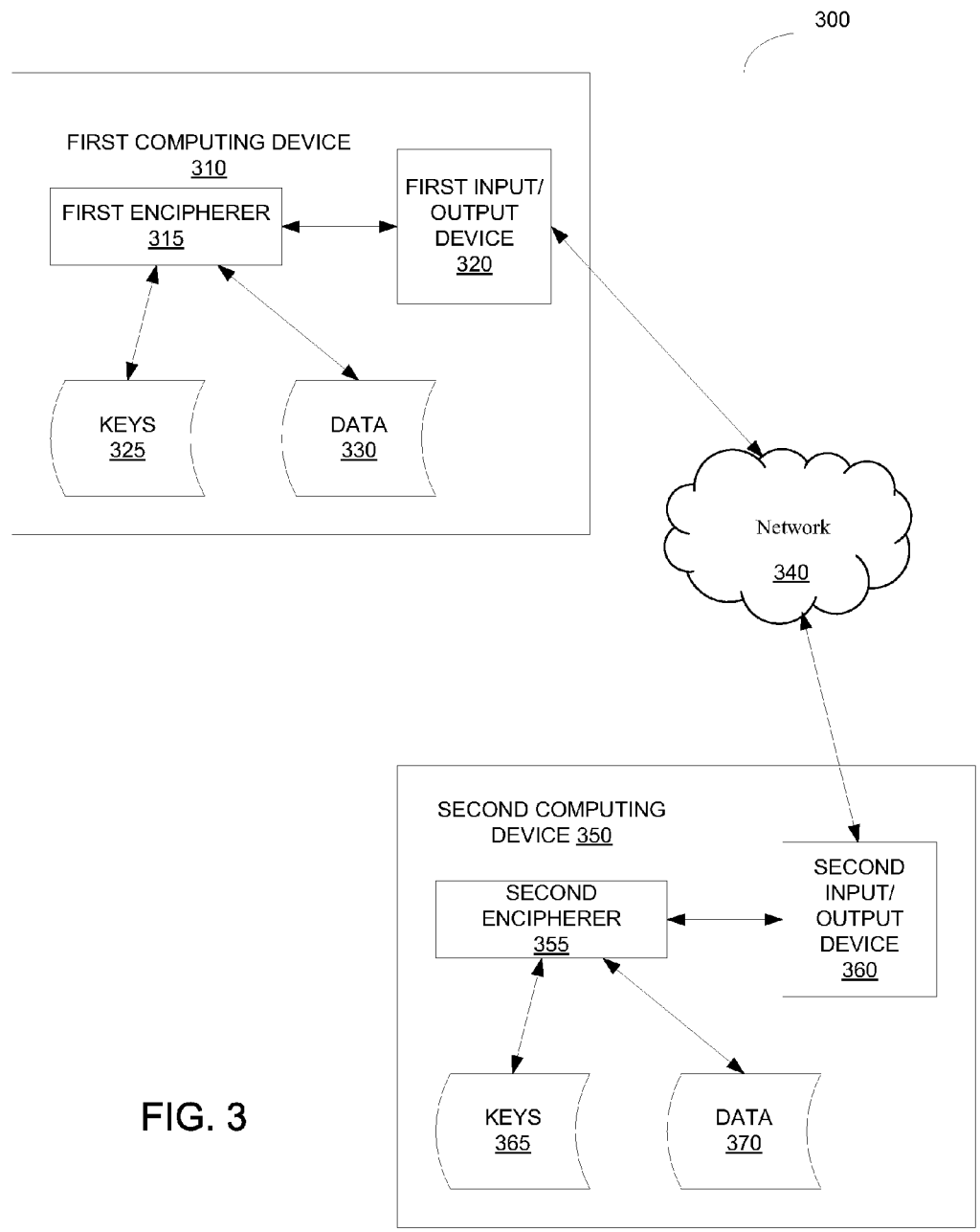
FIG. 3 illustrates an exemplary network architecture, in which embodiments of the present invention may operate.

FIG. 3 illustrates an exemplary network architecture 300, in which embodiments of the present invention may operate. The network architecture 300 may include a first computing device 310 connected to a second computing device 350 via a network 340, which may include a public network (e.g., Internet) and/or a private network (e.g., Ethernet or a local area Network (LAN)).

First computing device 310 and second computing device 350 may be personal computers (PCs), servers, personal data assistants (PDAs), cellular phones, etc. First computing device 310 and/or second computing device 350 may be connected with one or more additional computing devices (not shown), and may provide data encryption services to the additional computing devices. Thereby, it may not be necessary for the additional computing devices to include an encipherer.

Each of the first computing device 310 and the second computing device 350 includes an input/output 320 and 360, an encipherer 315 and 355, data 330 and 370, and keys 325 and 365, respectively. In one embodiment, the first encipherer 315 and second encipherer 355 are each examples of encipherer 100 of FIG. 1. First encipherer 315 enciphers data 330 using a current IV combined with keys 325, which may be internal or external to first computing device 310. For instance, first encipherer 315 may use one or more prior ciphertext blocks as a current IV and XOR the current IV with one of the keys 325 to generate a current key to encipher a current plaintext block. The one or more ciphertext blocks may correspond to bits having a predetermined value in a stream of bits generated randomly by a stream cipher of first encipherer 315. First encipherer 315 forwards the encrypted data 330 to the first input/output 320, which sends the encrypted data over the network 340 to the second input/output 360 of the second computing device 350. Data may be sent between first input/output 320 and second input/output 360 using a network application. Examples of network applications include those that communicate using file transfer protocol (FTP), telnet, email, instant messaging, hypertext transfer protocol (HTTP), etc. The second input/output device 360 passes on the data to the second encipherer 355, which decrypts the data 370 using keys 365 and the stream of bits.

Figure 4:
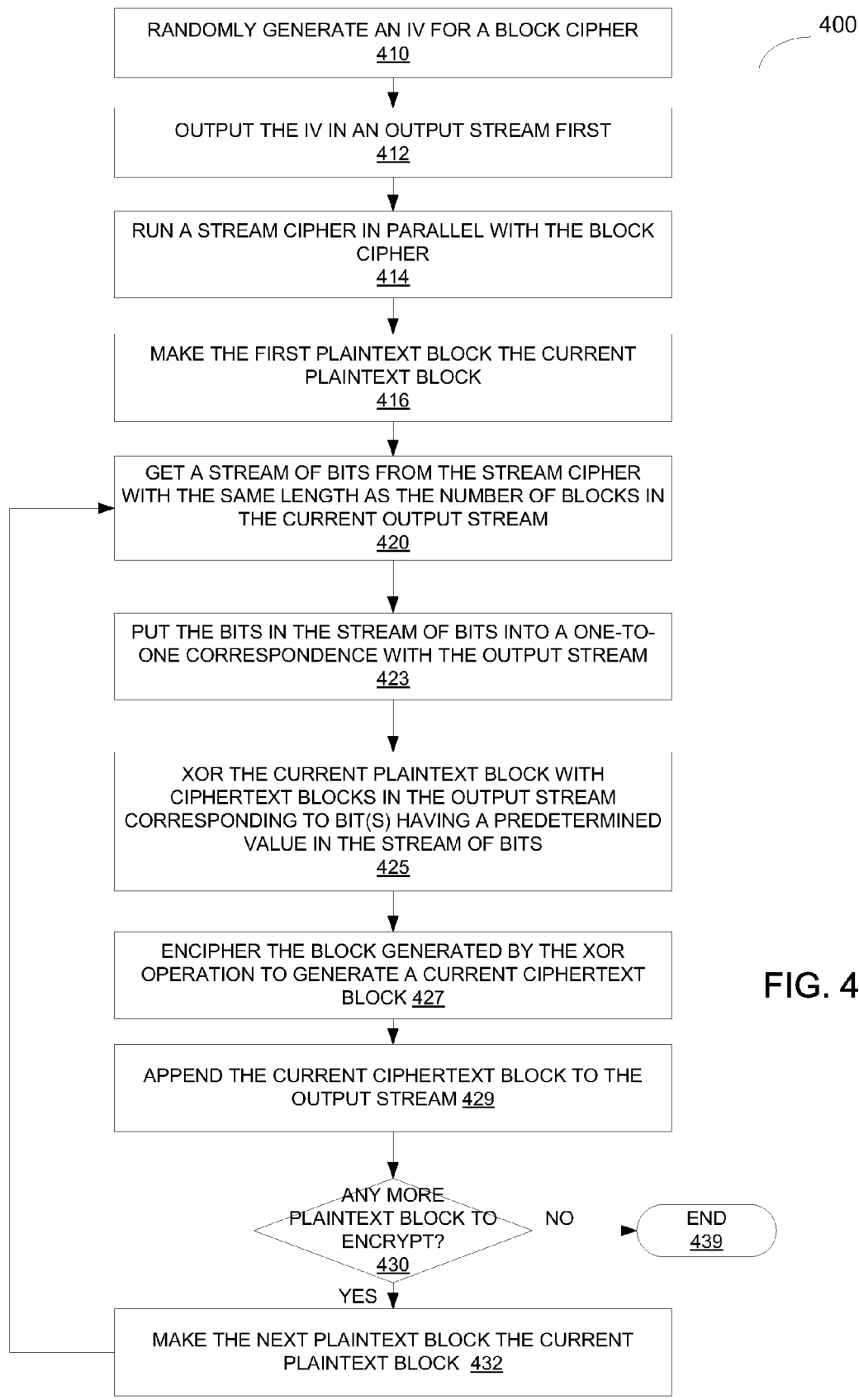
FIG. 4 illustrates a flow diagram of one embodiment for a method of encrypting data.

FIG. 4 illustrates a flow diagram of one embodiment for a method 400 of encrypting data. The method may be performed by processing logic that may comprise hardware (e.g., circuitry, dedicated logic, programmable logic, microcode, etc.), software (such as instructions run on a processing device), or a combination thereof. In one embodiment, method 400 is performed by encipherer 100 of FIG. 1

Referring to FIG. 4, method 400 begins by randomly generating an IV for a block cipher (block 410). The IV is output in an output stream first (block 412). A stream cipher is run in parallel with the block cipher (block 414). In some embodiments, the stream cipher randomly generates a stream of bits. Using the stream of bits, an encipherer may encipher a stream of plaintext block as follows.

In some embodiments, the first plaintext block in the stream of plaintext block is made the current plaintext block (block 416). Then the encipherer gets the stream of bits from the stream cipher with the same length as the number of blocks in the current output stream (block 420). The encipherer puts the bits in the stream of bits into a one-to-one correspondence with the output stream (block 423). For example, bits in the stream of bits may be sequentially associated with ciphertext blocks in the output stream. Then the current plaintext block is XOR'ed with ciphertext blocks in the output stream corresponding to bits having a predetermined value in the stream of bits (block 425). For example, the current plaintext block may be XOR'ed with ciphertext blocks that correspond to "1" bits in the stream of bits. Then the block generated by the XOR operation is enciphered to generate a current ciphertext block (block 427). The current ciphertext block is appended to the output stream (block 429).

The encipherer then determines if there is any more plaintext block to encrypt (block 430). If there is, then the encipherer returns to block 420 to repeat the above operations. Otherwise, if there is no more plaintext block to encrypt, the method ends at block 439.

Figure 5:
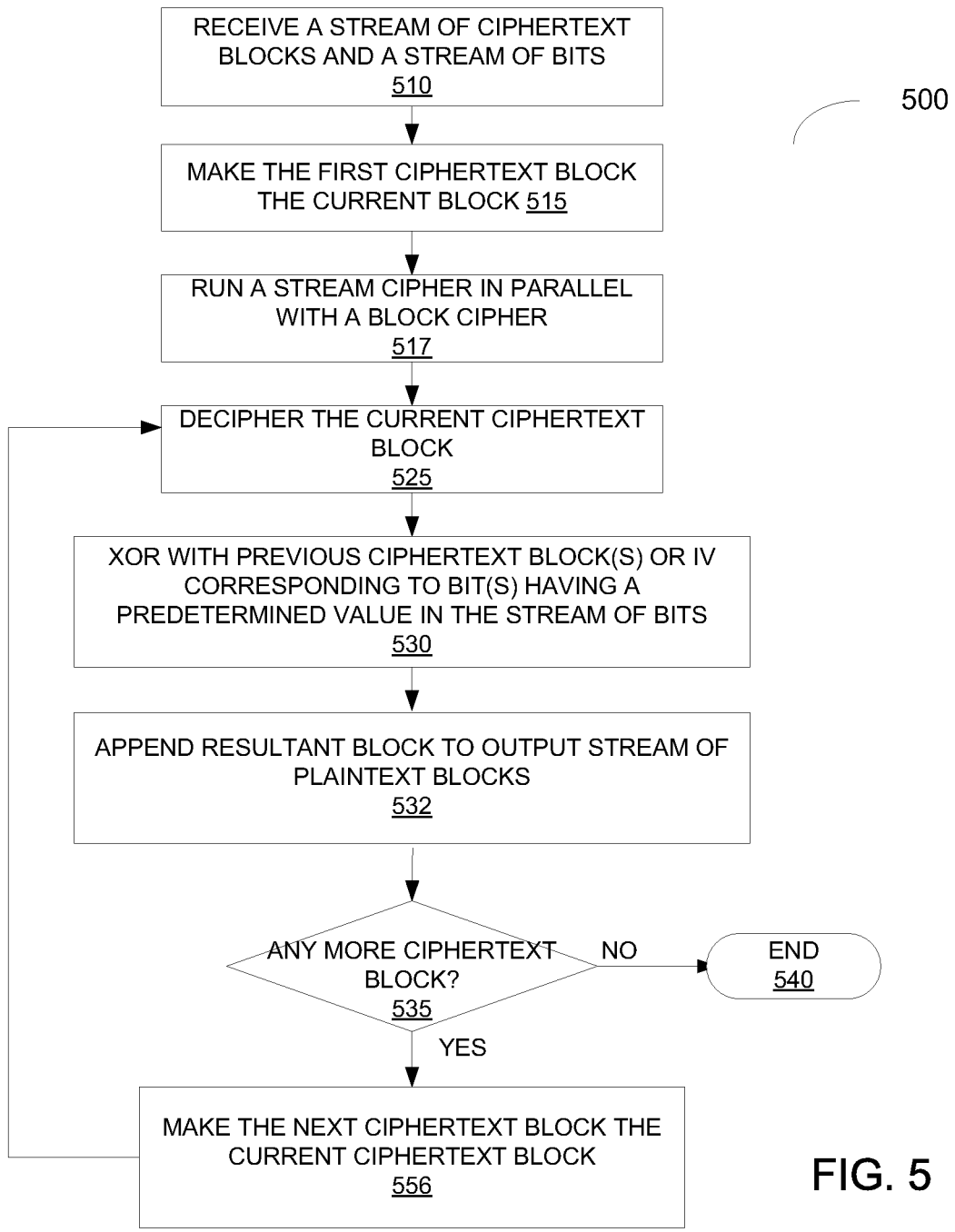
FIG. 5 illustrates a flow diagram of one embodiment for a method of decrypting data.

FIG. 5 illustrates a flow diagram of one embodiment for a method 500 of decrypting data. The method may be performed by processing logic that may comprise hardware (e.g., circuitry, dedicated logic, programmable logic, microcode, etc.), software (such as instructions run on a processing device), or a combination thereof. In one embodiment, method 500 is performed by encipherer 100 of FIG. 1.

Referring to FIG. 5, method 500 begins by receiving a stream of ciphertext blocks and a stream of bits (block 510). Then the encipher makes the first ciphertext block in the stream to be the current ciphertext block (block 515). In addition, a stream cipher is run in parallel with a block cipher of the encipher (block 517). Then the encipherer may decrypt the ciphertext blocks into plaintext blocks as follows.

In some embodiments, the encipherer deciphers the current ciphertext block (block 525). Then the previous ciphertext block(s) or IV corresponding to bit(s) having a predetermined value in the stream of bits are XOR'd with the current ciphertext block (block 530). The resultant block is the corresponding plaintext block, which is then appended to an output stream of plaintext block (block 532).

At block 535, the encipherer checks to determine if there is any more ciphertext block to decipher. If there is, then the encipherer makes the next block of ciphertext block the current block of ciphertext block (block 556) and returns to block 525 to repeat the above operations. Otherwise, if there is no more ciphertext block, then the process ends at block 540.

To further illustrate the above enciphering and deciphering techniques, an example is discussed in details below. It should be apparent that many details provided in the following example are meant to be illustrative, not limiting. One of skill in the art would readily recognize variations are possible in other embodiments.

In the following example, the word "Hello," represented in ASCII as the hex bytes 48 65 6c 6c 6f, will be enciphered using the operation of "rotate left by 1, XOR 51 hex" as the block cipher enciphering operation (on blocks of 8, bits), with an IV of cc hex. A stream cipher running in parallel with the block cipher generates the following bits: 1 00 001 0001 10110 011110 . . .

The enciphering operation may generate the IV (cc hex), and then encipher the first "block," which is the value 48 hex. Because the first bit of the stream cipher is 1, so the IV would be XOR'ed with the block before encipherment, i.e., 48^cc=84. This enciphers to 58 hex, so the output stream is now: cc 58.

Next, the encipher operation does not XOR anything into the next block (i.e., 65 hex) before enciphering it to 9b hex because both bits in the bit stream corresponding to the previous blocks in the output stream are 0. An output stream: cc 58 9b is generated. The next block is XOR'ed with be, i.e., 6c ^ be=d2;, d2, enciphers to f4. Therefore, the output stream becomes cc 58 9b be f4. The final block is XOR'ed with cc, 9b, and be: 6f ^ cc ^ 9b ^ be=86; and 86 is enciphered to 5c. Therefore, the output stream becomes cc 58 9b be f4 5c.

To decipher the above output stream, the decipherer begins by deciphering the first ciphertext block (i.e., 58), which deciphers to 84. Then, because the first bit from the stream cipher is "1," this is XOR'ed with the IV (i.e., cc), giving 48. The next block of ciphertext is deciphered from 9b to 65. Since the two bits from the stream cipher are both zero, this block is put in the output stream as is, resulting in an output stream of: 48, 65. The next block of ciphertext (be) is deciphered to f7. This block is XOR'ed with 9b because the bits of 001, from the stream cipher indicate that only the last block of ciphertext is used to XOR with this block. The resultant block is 6c, which is appended to the output stream. The next block of ciphertext (f4) is deciphered to d2, then XOR'ed with be to produce 6c. The final block of ciphertext (5c) is deciphered to 86, and then XOR'ed with cc, 9b, and be, producing 6f. As such, the original word "Hello" in hex, i.e., 48 65 6c 6c 6f, is produced and the decryption is completed.

Figure 6:
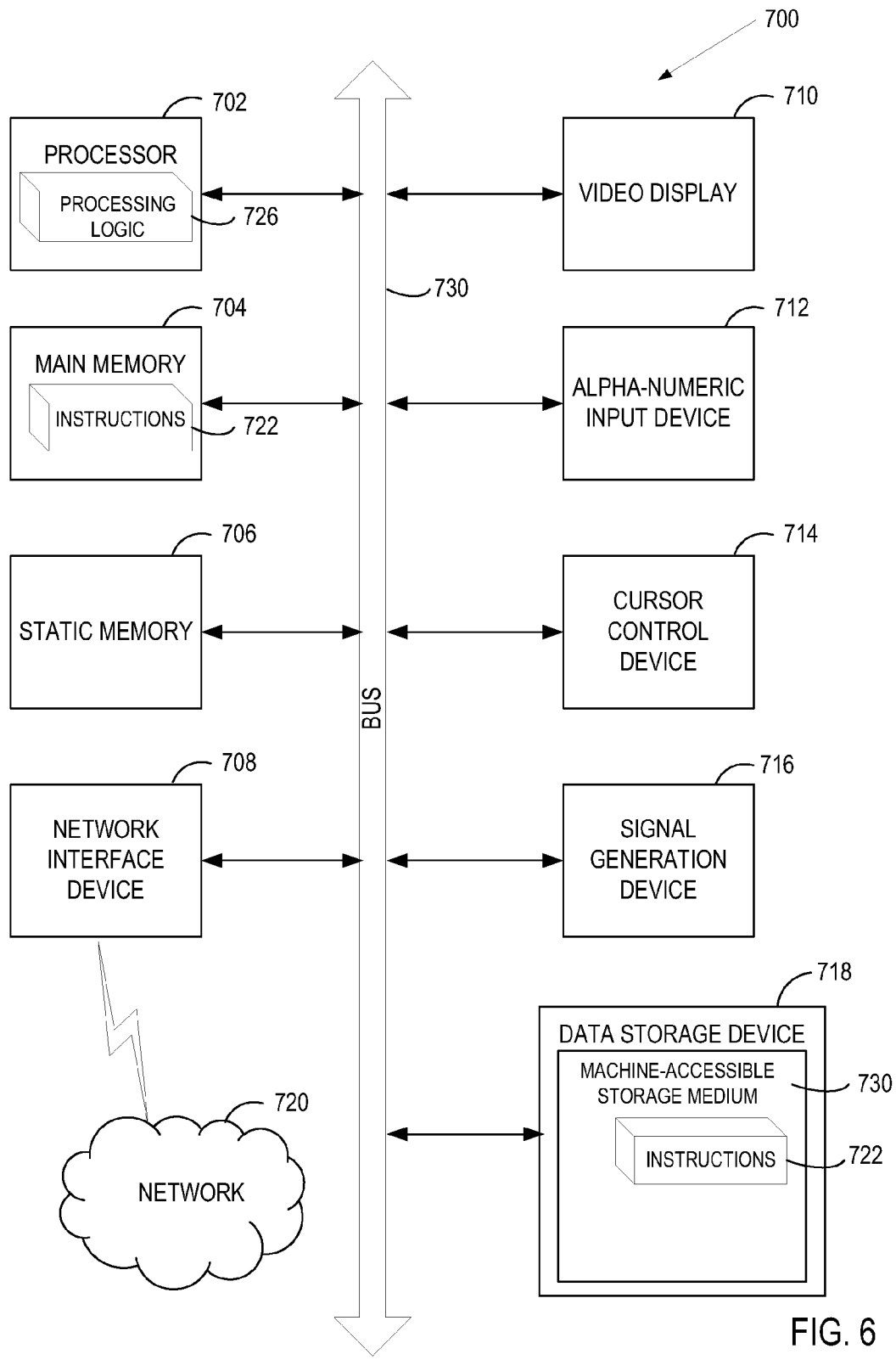
FIG. 6 illustrates a block diagram of an exemplary computer system, in accordance with one embodiment of the present invention.

FIG. 6 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

The machine-accessible storage medium 730 may also be used to store data structure sets that define user identifying states and user preferences that define user profiles. Data structure sets and user profiles may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A computer-implemented method comprising:
   generating, by a stream cipher executable by a processing device, a stream of bits with a length equal to a number of ciphertext blocks in an output stream of a block cipher;
   processing, by an encipherer executable by the processing device, a current plaintext block in view of the stream of bits and the number of ciphertext blocks in the output stream of the block cipher; and
   enciphering, by the block cipher executable by the processing device, a result of the processing to generate a current ciphertext block.

2. The method of claim 1, wherein processing the current plaintext block comprises:
   for each of a plurality of ciphertext blocks in the output stream,
      putting bits of the stream of bits in a one-to-one correspondence with the plurality of ciphertext blocks in the output stream;
      performing an exclusive-or (XOR) operation on the current plaintext block with each ciphertext block of the output stream of the block cipher having a corresponding bit in the stream of bits being a predetermined value.

3. The method of claim 1, further comprising:
   generating a block-sized random value as an initial vector for the block cipher.

4. The method of claim 1, further comprising:
   using a randomly generated initial vector of the block cipher as a message key of the stream cipher.

5. The method of claim 1, wherein processing the current plaintext block comprises:
   performing an XOR operation on the current plaintext block with a block at a predetermined location in the output stream, in addition to zero or more additional blocks from the output stream.

6. An apparatus comprising:
   a processing device;
   a stream cipher executable by the processing device to generate a stream of bits with a length equal to a number of ciphertext blocks in an output stream of a block cipher;
   an encipherer executable by the processing device to process a current plaintext block in view of the stream of bits and the number of ciphertext blocks in the output stream of the block cipher; and
   the block cipher executable by the processing device to encipher a result from the processing device to generate a current ciphertext block.

7. The apparatus of claim 6, wherein processing the current plaintext block comprises: for each of a plurality of ciphertext blocks in the output stream, putting bits of the stream of bits in a one-to-one correspondence with the plurality of ciphertext blocks in the output stream and performing an exclusive-or (XOR) operation on the current plaintext block with each ciphertext block of the output stream of the block cipher having a corresponding bit in the stream of bits being a predetermined value, and wherein the block cipher enciphers a block generated from the XOR operation to generate the current ciphertext block.

8. The apparatus of claim 6, further comprising:
   an initialization vector generator to generate a block-sized random value as an initial vector for the block cipher.

9. The apparatus of claim 6, wherein a randomly generated initial vector of the block cipher is used as a message key of the stream cipher.

10. The apparatus of claim 6, further comprising an input/output device to append the current ciphertext block to an output stream.

11. The apparatus of claim 6, wherein the processing device is further to perform an XOR operation on the current plaintext block with a block at a predetermined location in the output stream, in addition to zero or more additional blocks from the output stream.

12. A system comprising the apparatus of claim 6, further comprising:
   a network, wherein the current ciphertext block is sent via the network to a computing device.

13. A non-transitory computer-readable storage medium that provides instructions that, when executed by a processing device, will cause the processing device to perform a method comprising:
   generating, by a stream cipher executable by the processing device, a stream of bits with a length equal to a number of ciphertext blocks in an output stream of a block cipher;
   processing, by an encipherer executable by the processing device, a current plaintext block in view of the stream of bits and the number of ciphertext blocks in the output stream of the block cipher; and
   enciphering, by the block cipher executable by the processing device, a result of the processing to generate a current ciphertext block.

14. The non-transitory computer-readable storage medium of claim 13, wherein processing the current plaintext block comprises:
   for each of a plurality of ciphertext blocks in the output stream,
      putting bits of the stream of bits in a one-to-one correspondence with the plurality of ciphertext blocks in the output stream;

performing an exclusive-or (XOR) operation on the current plaintext block with each ciphertext block of the output stream of the block cipher having a corresponding bit in the stream of bits being a predetermined value.

15. The non-transitory computer-readable storage medium of claim 13, wherein the method further comprises:
generating a block-sized random value as an initial vector for the block cipher.

16. The non-transitory computer-readable storage medium of claim 13, wherein the method further comprises:
using a randomly generated initial vector of the block cipher as a message key of the stream cipher.

17. The non-transitory computer-readable storage medium of claim 13, wherein processing the current plaintext block comprises:
performing an XOR operation on the current plaintext block with a block at a predetermined location in the output stream, in addition to zero or more additional blocks from the output stream.

18. A method comprising:
receiving a stream of ciphertext blocks and a stream of bits, wherein the ciphertext blocks have been generated by a block cipher and the stream of bits have been generated by a stream cipher running in parallel with the block cipher;
deciphering a current ciphertext block of the stream of ciphertext blocks; and
performing, by a processing device, an exclusive-OR (XOR) operation on the deciphered block and one or more ciphertext blocks of the stream of ciphertext blocks in view of the stream of bits to generate a current plaintext block.

19. The method of claim 18, wherein performing the XOR operation on the deciphered block and the one or more ciphertext blocks of the stream of ciphertext blocks comprises:
performing the XOR operation on the deciphered block and the one or more ciphertext blocks of the stream of ciphertext blocks corresponding to bits having a predetermined value in the stream of bits to generate the current plaintext block.

20. The method of claim 18, further comprising:
appending the current plaintext block to an output stream of plaintext blocks,
wherein the stream of bits have been randomly generated by the stream cipher in parallel with the block cipher.

21. An apparatus comprising:
a processing device;
an input/output device to receive a stream of ciphertext blocks and a stream of bits, wherein the ciphertext blocks have been generated by a block cipher and the stream of bits have been generated by a stream cipher running in parallel with the block cipher;
an encipherer, executable by the processing device, to decipher a current ciphertext block of the stream of ciphertext blocks; and
an exclusive-OR (XOR) module executable by the processing device to perform an XOR operation on the deciphered block and one or more ciphertext blocks of the stream of ciphertext blocks in view of the stream of bits to generate a current plaintext block.

22. The apparatus of claim 21, wherein the XOR module performs the XOR operation on the deciphered block and the one or more ciphertext blocks of the stream of ciphertext blocks corresponding to bits having a predetermined value in the stream of bits to generate the current plaintext block.

23. The apparatus of claim 21, wherein the input/output device appends the current plaintext block to an output stream of plaintext blocks, and wherein the stream of bits have been randomly generated by the stream cipher in parallel with the block cipher.

24. A non-transitory computer-readable storage medium that provides instructions that, when executed by a processing device, will cause the processing device to perform operations comprising:
receiving, by the processing device, a stream of ciphertext blocks and a stream of bits, wherein the ciphertext blocks have been generated by a block cipher and the stream of bits have been generated by a stream cipher running in parallel with the block cipher;
deciphering, by the processing device, a current ciphertext block of the stream of ciphertext blocks; and
performing, by the processing device, an exclusive-OR (XOR) operation on the deciphered block and one or more ciphertext blocks of the stream of ciphertext blocks in view of the stream of bits to generate a current plaintext block.

25. The non-transitory computer-readable storage medium of claim 24, wherein performing the XOR operation on the deciphered block and the one or more ciphertext blocks of the stream of ciphertext blocks comprises:
performing the XOR operation on the deciphered block and the one or more ciphertext blocks of the stream of ciphertext blocks corresponding to bits having a predetermined value in the stream of bits to generate the current plaintext block.

26. The non-transitory computer-readable storage medium of claim 24, wherein the operations further comprise:
appending the current plaintext block to an output stream of plaintext blocks,
wherein the stream of bits have been randomly generated by the stream cipher in parallel with the block cipher.

* * * * *